Patented May 17, 1932

1,858,823

UNITED STATES PATENT OFFICE

CRAWFORD H. GREENEWALT, OF WILMINGTON, DELAWARE, ASSIGNOR TO E. I. DU PONT DE NEMOURS & COMPANY, OF WILMINGTON, DELAWARE, A CORPORATION OF DELAWARE

DEHYDROGENATION PROCESS FOR MAKING ESTERS

No Drawing.   Application filed June 8, 1928.   Serial No. 284,001.

This invention relates, in general, to dehydrogenation processes, and has particularly to do with (reversible) catalytic dehydrogenation processes in which the reactant and product are non-gaseous (liquid or solid) at normal temperature, and also has to do with the catalytic dehydrogenation of organic compounds which are non-gaseous (liquid or solid) at normal temperature. It is well-known that reversible reactions can proceed only to a definite point, i. e. to an equilibrium established by the operating conditions, as temperature, pressure, and the like; and a major difficulty is that in many cases the equilibrium reached under work conditions heretofore used represents a very small and unsatisfactory conversion to the desired products. I have devised a method of operating, in processes of the general character mentioned, whereby previous difficulties are overcome, and satisfactory conversion readily obtained. It is a major object of the invention to provide such a method. To these ends, and also to improve generally upon methods and processes of the general character indicated, the invention consists in the various matters hereinafter described and claimed.

I have discovered that by placing in series a group of reaction vessels, each provided with means for removing one of the products of the reaction after each vessel, whereby the said one of the products may be removed from the process substantially as produced, high yields are readily obtained; and these are obtained without the necessity of interrupting the progess of the reaction for the removal of both products. The present method is based on this discovery.

While not restricting the invention thereto, it is, for definiteness of description, described with more particular reference to the dehydrogenation of ethyl alcohol to ethyl acetate at high pressure:—

In this procedure hydrogen is formed in an amount equivalent to the ethyl acetate, as shown by the equation

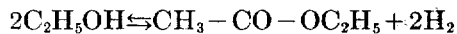
$$2C_2H_5OH \rightleftharpoons CH_3-CO-OC_2H_5 + 2H_2$$

and in normal operation, as carried out with the aid of a catalyst (e. g. zinc chromite), the reaction proceeds until the equilibrium conditions have been established. Working, for example, with a zinc chromite at 400° C. and 3000 pounds per square inch pressure, the equilibrium conditions are equivalent to a twelve percent conversion of ethyl alcohol. If, when working as above indicated, the liquid and gaseous products are passed directly to and over a second catalyst, the conversion may be increased by one percent to a total of thirteen percent. In contrast to this, when the present invention is practiced, and the hydrogen produced at the first catalyst is removed, preferably continuously, before the products pass to the second catalyst, thus allowing only the liquid products to pass to the second catalyst, a fifty percent increase in conversion is obtained.

The following example is given to show in greater detail how the invention may be carried out in practice.

Ethyl alcohol is passed at a temperature of 400° C. and 3000 lbs. per square inch pressure over a catalyst consisting of zinc chromite. In passing over the catalyst twelve percent of the ethyl alcohol is converted to ethyl acetate. The gaseous and liquid products then pass to a separator whereby well-known means the gas is removed from the system in a continuous manner.

The liquid (still at 3000 lbs. pressure) is then passed over a second similar catalyst which is maintained at 400° C. In passing over this catalyst an additional six percent of ethyl alcohol is converted to ethly acetate, making a total of 18% converted. If the separation is repeated and the liquid is again passed over a third catalyst maintained at 400° C. three percent additional conversion is obtained bringing the net conversion to 21%. The liquid product is finally expanded to atmospheric pressure and the ethyl acetate separated by known means. By this method of working, the handling and distillation costs of the very large volume of undesired ethyl alcohol are materially reduced, with a considerable saving of expense.

This invention is applicable generally to reversible catalytic processes in which at least two products are formed, one of which is gaseous and the other non-gaseous. The gaseous constituent may then be eliminated as described hereinbefore, between two catalytic operations or between all of them as desired.

As many apparently widely different embodiments of this invention may be made without departing from the spirit thereof, it is to be understood that I do not limit myself to the foregoing examples or descriptions except as indicated in the following patent claims:

I claim:

1. In the process of forming ethyl acetate and gaseous products by bringing the vapor of ethyl alcohol under high superatmospheric pressure successively into contact with a series of catalytic dehydrogenating masses containing a difficultly reducible dehydrogenating metal oxide, the step which comprises removing the gaseous products from the alcohol and ethyl acetate between successive contacts.

2. In the process of forming ethyl acetate and hydrogen by bringing the vapor of ethyl alcohol under high superatmospheric pressure successively into contact with a series of catalytic dehydrogenating masses containing zinc oxide, the step which comprises removing the hydrogen from the alcohol and ethyl acetate between successive contacts.

3. In the process of forming ethyl acetate and hydrogen by bringing the vapor of ethyl alcohol under high superatmospheric pressure successively into contact with a series of zinc chromite masses, the step which comprises separating the hydrogen from the ethyl alcohol and ethyl acetate between successive contacts.

4. In the catalytic dehydrogenation of ethyl alcohol to form ethyl acetate and hydrogen by bringing the vapor of ethyl alcohol under a pressure of about 3,000 pounds per square inch at a temperature of about 400° C. successively into contact with a series of zinc chromite masses, the step which comprises removing the hydrogen from the alcohol and ethyl acetate between successive contacts.

5. The process of forming ethyl acetate and gaseous products which comprises bringing the vapor of ethyl alcohol under a pressure of about 3000 pounds per square inch at a temperature of about 400° C. successively into contact with a series of catalytic dehydrogenating masses containing a difficultly reducible dehydrogenating metal oxide, and removing the gaseous products from the alcohol and ethyl acetate between successive contacts.

6. The process of forming ethyl acetate and gaseous products which comprises bringing the vapor of ethyl alcohol under a pressure of about 3000 pounds per square inch at a temperature of about 400° C. successively into contact with a series of catalytic dehydrogenating masses containing zinc oxide, and removing the gaseous products from the alcohol and ethyl acetate between successive contacts.

In testimony whereof, I affix my signature.

CRAWFORD H. GREENEWALT.